Patented Dec. 9, 1924.

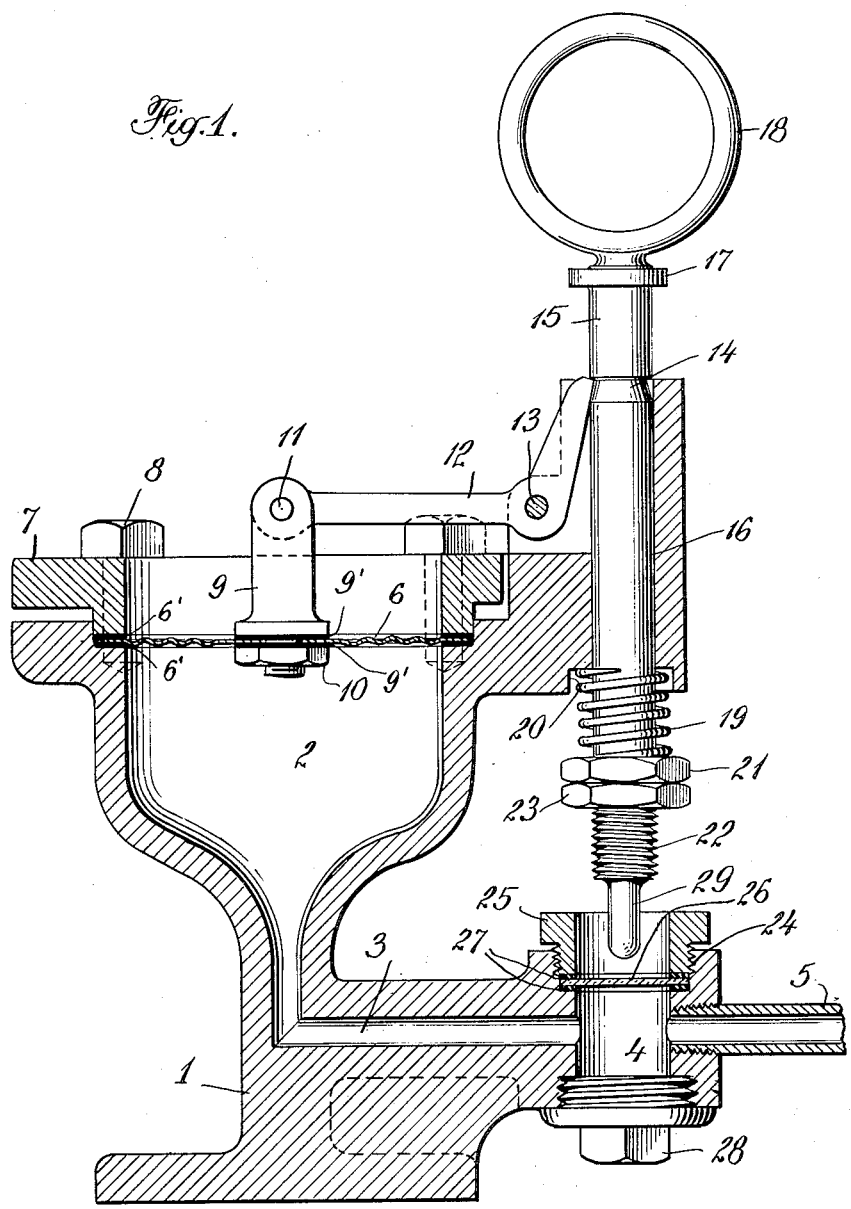

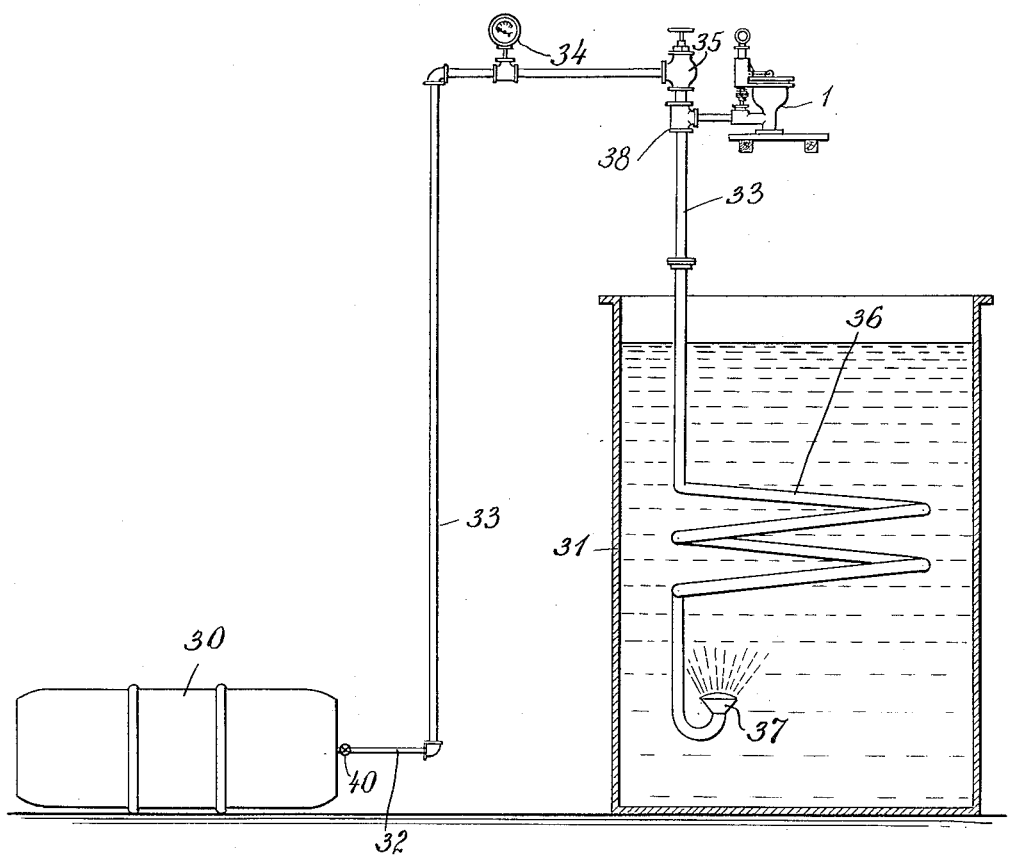

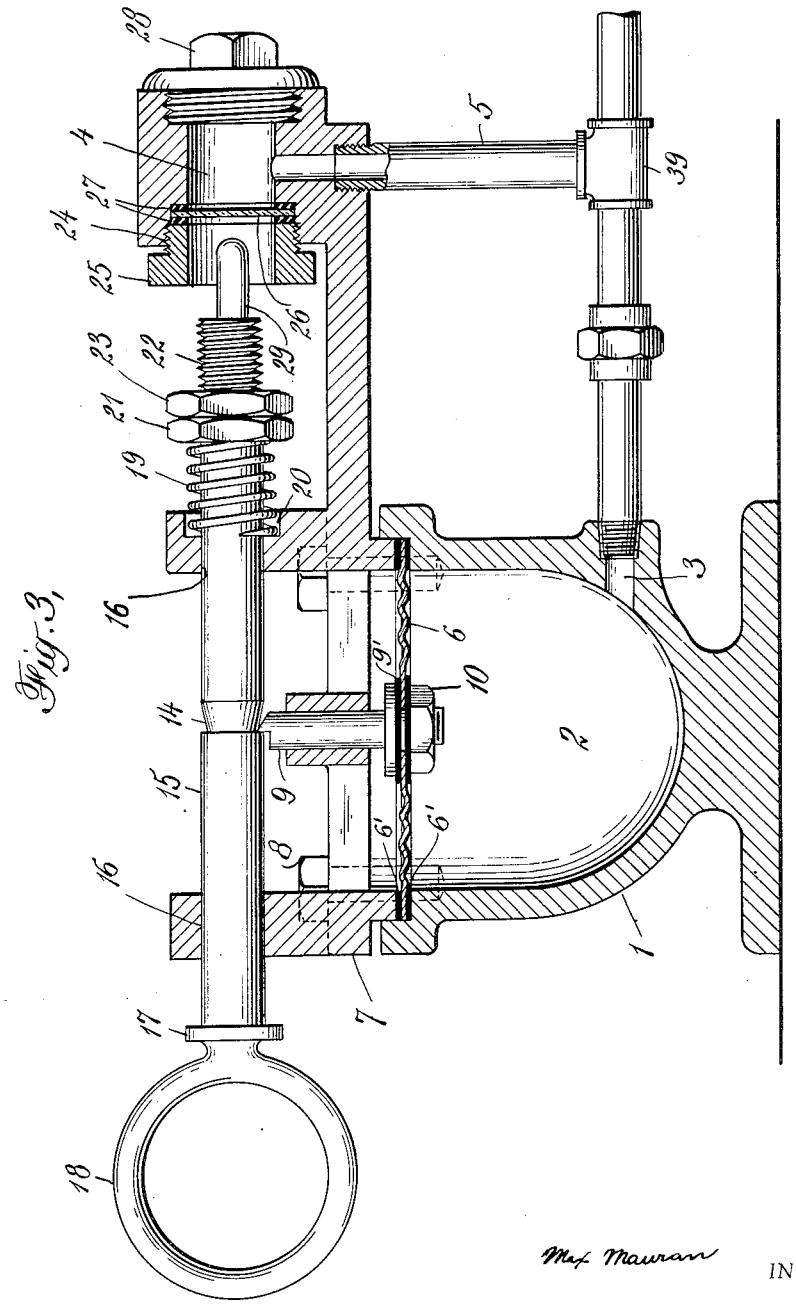

1,518,595

UNITED STATES PATENT OFFICE.

MAX MAURAN, OF NIAGARA FALLS, NEW YORK, ASSIGNOR TO THE MATHIESU ALKALI WORKS, INC., OF NEW YORK, N. Y., A CORPORATION OF VIRGINIA.

GAS-ABSORPTION APPARATUS.

Application filed January 20, 1923. Serial No. 613,817.

*To all whom it may concern:*

Be it known that I, MAX MAURAN, a citizen of the United States, residing at Niagara Falls, in the county of Niagara, State of New York, have invented certain new and useful Improvements in Gas-Absorption Apparatus; and I do hereby declare the following to be a full, clear, and exact description of the invention, such as will enable others skilled in the art to which it appertains to make and use the same.

This invention relates to improvements in gas absorption apparatus, such as apparatus for the absorption of chlorine in milk-of-lime. More particularly, the invention relates to such an apparatus having means for the prevention of a vacuum within the apparatus such as will cause the liquid to be drawn back into the portion of the apparatus normally filled with gas. The invention also includes improvements in vacuum breaks adapted for use in such apparatus for establishing connection with the atmosphere upon the formation of a vacuum in the apparatus, thereby breaking the vacuum.

When chlorine gas is supplied from a compressed or liquefied source, for example, from a liquid chlorine container, the pressure of the chlorine is considerably above atmospheric and is relied upon to force the chlorine into the absorption liquid. When, however, the chlorine container is emptied to a point where no super-atmospheric pressure remains, the liquor being chlorinated has a tendency to be sucked back into the chlorine container. For example, when the operator forgets to close the valves leading from the chlorine container to the vessel containing the absorption solutions and when the pressure in the container falls to atmospheric, the solution continues to absorb gas and is thus sucked back into the pipe connections and even into the container itself, with resulting damage to the container and to the connecting piping.

It is an object of the present invention to provide apparatus which will automatically prevent the formation of a vacuum in the connecting piping and container thereby preventing the sucking back of any of the absorption liquid.

The invention will be further described in connection with the accompanying drawings illustrating one embodiment thereof.

In the accompanying drawing:

Fig. 1 is a detailed sectional view illustrating the vacuum break device, and

Fig. 2 is a diagrammatic view showing the gas absorption system with the vacuum break embodied therein.

Fig. 3 is a detailed sectional view of another modification of the vacuum break device.

In Figs. 1 and 3 the same reference numerals are used to designate like parts.

In the apparatus of the invention there is installed between the chlorine container and the tank containing the solution to be chlorinated a vacuum break device such as that illustrated in Fig. 1 or Fig. 3.

The embodiment of the invention thus illustrated in Fig. 1 comprises a casting 1 of bowl-shaped design having its cavity 2 communicating through the tube 3 with the chamber 4 which is in turn connected to the gas container or to a section of the gas connecting piping by the pipe 5.

The bowl 2 of the casting is covered by a flexible diaphragm 6 held in place by an annular ring 7 fastened to the casting 1 by means of cap-screws 8. Leakage of air between diaphragm 6, bowl 2 and annular ring 7 is prevented by gasket 6'. Mounted upon the flexible diaphragm 6 is a stud 9 clamped to the diaphragm by nut 10 and a leakage of air between stud 9 and diaphragm 6 is prevented by gasket 9'. Stud 9 is connected at its upper end by means of bearing pin 11 with a bell-crank lever or trigger member 12, pivotally mounted at 13. The upper arm of this bell-crank lever or trigger member is arranged and adapted to engage a notch or groove 14 in the ram or plunger member 15. This plunger is slidably mounted in bearing 16 formed as an extension of the casting 1. Downward movement of the plunger is limited by the collar 17 adapted to abut against the upper portion of the bearing 16. The handle or ring 18 provides convenient means to raise the ram to permit it to engage the trigger member 12. The ram 15 is maintained under a downward pressure or tension by the spring 19 which bears at its upper end in the annular groove 20 in the casting 1 and at its lower end upon the adjusting end nut 21 mounted upon the threaded portion 22 of the plunger. Adjustment of this spring tension is accomplished by means of the nut 21 and lock nut 23.

The chamber 4 of the casting is provided with an upper annular recess 24 in which is threaded a packing nut 25 which serves to clamp in place a fragile or frangible partition 26, washers 27 being provided to make a tight joint. A cap screw 28 is threaded into the lower portion of the chamber 24 to provide access thereto. The arrangement of the frangible partition 26 and of the chamber 4 is such that the plunger 15, when released, is projected downwardly to break the partition 26 while the downward movement into the chamber 4 is limited by the ring 17.

Fig. 3 illustrates a modification of Fig. 1 in which the plunger 15 is placed horizontally and the plunger bearing 16 and chamber 4 are in a single casting which is integral with the annular ring 7. The stud 9 is adapted to engage with the notch 14 without intermediate connections. The chambers 2 and 4 are connected to the chlorine line through the pipe 5, T 38 and pipe 33.

The connection of the vacuum break device with the chlorination apparatus is illustrated in Fig. 2. A suitable chlorine container, shown as a cylinder or drum for containing liquid chlorine, is indicated at 30 and is connected by means of piping 32, 33 and coil 36 to the delivery nozzle 37 for discharging the chlorine into the solution contained in the receptacle 31. The connecting piping is provided with a pressure gauge 34 and with an expansion valve 35. The coil 36 is a vaporizing or expansion coil, for the purpose of cooling the solution being chlorinated by the expansion of the gas therein, before discharging it through the nozzle 37 into the solution.

In such an apparatus as that illustrated in Fig. 2, if the vacuum break device 1 were not included, the pressure in the container 30 and in the connecting piping would finally be reduced, when the chlorine was all used up except that required to fill the apparatus at atmospheric pressure, until there would be no excess pressure in the container and in the piping. The solution, if it contained an excess of milk-of-lime, would continue to absorb chlorine and would enter the coil 36 and the piping 33, owing to this absorption and to the absence of any excess pressure to prevent. This absorption of chlorine would cause a partial vacuum in the piping 33 which, unless prevented, would finally cause the solution to be sucked back into the container 30 which would result in damage to the container and which would be a source of danger.

By providing the vacuum break device in the connecting piping, as illustrated in Fig. 2, for example, by connecting it with the piping through the T 38, the apparatus is protected from this danger.

The operation of the apparatus and of the vacuum break device is as as follows: When for any reason the pressure in the container and connecting piping falls below atmospheric, as when the container is exhausted or when the chlorine is turned off at the container without also closing the valve 35, the solution continues to absorb the gas remaining in the pipes 36 and 33. This causes the solution to rise in the pipe 33 above the level of the liquor therein, and the resulting difference in head will slightly reduce the pressure in the pipe 33 and cause a partial vacuum therein. The area of the diaphragm 6 is sufficiently large so that a slight reduction in pressure in the connecting piping and container will result in the forcing down or drawing down of the diaphragm 6 which will act to release the trigger member 12 and permit the plunger 15 to be forced downwardly with considerable force by its own weight and by the action of the spring 19. The plunger 15 will shatter the diaphragm 26 and admit atmospheric air into the system, thus breaking the vacuum and preventing further rise of the liquor in the pipe 33. It will be evident, in case the diaphragm 26 has been shattered during the previous run, or for any other cause that when a new chlorine container is connected up or when the apparatus is again started a new diaphragm 26 must be inserted. To do this the plunger 15 is raised by means of the ring 18 until the trigger member 12 engages the notch 14, thereby holding the plunger in its raised position. By removing the packing nut 25 a new diaphragm can be inserted while broken portions of the shattered diaphragm can be removed from the orifice by removing the cap screw 28. The diaphragm 26 may be of glass or other suitable material. It should be capable of withstanding whatever pressure there may be in the connecting piping. The packing washers may be of any suitable material such as rubber which is resistant to the action of chlorine or other gas used in the apparatus. A suitable valve, shown conventionally at 40, is provided where the piping connects with the chlorine cylinder to prevent if necessary the chlorine entering piping 32 and 33. The vacuum break should be connected to the pipe line 33, between the expansion valve 35 and expansion coil 36, at sufficient height above the solution in the tank 31 so that the liquid from the same will not rise to the pipe leading to the vacuum break 1.

In order to provide against accidental release of the plunger while super-atmospheric pressure exists in the container and piping, the vacuum break device 1 may be provided with a cover (not shown) protecting it from access except when the cover is removed.

The invention is of special value and application in the chlorination of milk of lime and similar solutions where a relatively large amount of chlorine is utilized and where the chlorine is supplied in large containers. When, for example, a single chlorine container of one ton capacity is connected with a tank containing milk-of-lime or with a series of such tanks, the chlorination operation can be continued to the point of exhaustion of the container without danger of the formation of a vacuum such as will suck back the milk-of-lime solution into the connecting piping and into the container. If the valve 35 is closed before the pressure in the container and connecting piping falls below atmospheric, the vacuum break device will not be brought into use and the partition 26 will not be broken and will not need renewal. Should, however, the operator neglect to shut off the container before it is exhausted the vacuum break device will, nevertheless, prevent the formation of a vacuum such as will cause the chlorinated milk-of-lime solution to be drawn back into the container.

The apparatus is of more or less general application not only to the absorption of chlorine in milk of lime and other solutions, but also to the absorption of other gases where a similar objectionable tendency to the formation of a vacuum may exist.

I claim:

1. An apparatus for the absorption of gas in liquids comprising a source of gas under pressure, a container for liquids in which the gas is to be absorbed and piping connecting the same for conveying the gas to the liquid, together with means in said connections for automatically permitting access of atmospheric air and the breaking of a vacuum when the pressure falls to a predetermined degree below atmospheric, said connections being adapted to withstand superatmospheric pressure during normal operation, whereby the gas can be conveyed to the liquid under superatmospheric pressure, but whereby the sucking back of liquor into said connections is prevented.

2. An apparatus for absorbing chlorine in liquids to be chlorinated comprising a chlorine container, a receptacle adapted to contain the liquid to be chlorinated and connecting piping, in conjunction with a vacuum break device for destroying a partial vacuum in said connections when the pressure therein falls materially below atmospheric, said connections being adapted to withstand superatmospheric pressure during normal operation, whereby the gas can be conveyed to the liquid under superatmospheric pressure, but whereby the sucking back of liquor into said connections is prevented.

3. A vacuum break, comprising a partition, means to shatter said partition, and pressure actuated means to control said shattering means.

4. A vacuum break, comprising a partition, a ram adapted to shatter said partition, and pressure actuated means to control said ram.

5. A vacuum break, comprising a fragile partition, a ram adapted to shatter said partition, a spring to operate said ram, a latch adapted to engage said ram, and pressure actuated means to control said latch.

6. A vacuum break, comprising a fragile partition, a spring operated ram adapted to shatter said partition, trigger engaging means upon said ram, a trigger adapted to engage therewith, and a pressure actuated diaphragm to control said trigger.

7. A vacuum break, comprising a fragile partition, a ram mounted with its axis passing through said partition, a spring mounted to impel said ram toward said partition, trigger engaging means upon said ram, a trigger adapted to engage therewith, a diaphragm adapted to be actuated by a partial vacuum, means to control said trigger by said diaphragm.

8. A vacuum break for gas absorption apparatus, comprising a partition, said partition interrupting communication between a gas containing portion of the apparatus and an external atmosphere, means adapted to shatter said partition, and pressure actuated means to control said shattering means, said control means being in communication with a gas containing portion of the apparatus.

9. An apparatus for the absorption of gas in liquid comprising a source of gas under pressure, a container for liquids in which the gas is to be absorbed, and piping connecting the same for conveying the gas to the liquid, said piping extending at some portion of its length a considerable distance above the liquid level in said container and being adapted to be maintained under superatmospheric pressure during normal operation, together with means in said connection for automatically permitting access of atmospheric air and the breaking of a vacuum when the pressure falls to a predetermined degree below atmospheric, whereby the gas can be forced from the source of supply into the liquid in said container under the necessary pressure, and whereby the sucking back of the liquid into the piping above the liquid level is prevented.

10. An apparatus for absorbing chlorine in liquids to be chlorinated, comprising a chlorine container, a receptacle adapted to contain the liquids to be chlorinated, and connecting piping which extends to a level considerably above the liquid level at some point between the chlorine container and the liquid receptacle, in conjunction with a vacuum break device for destroying the partial vacuum in said connection when the pressure therein falls materially below atmospheric, said connections being adapted to withstand a pressure above atmospheric, whereby the chlorine gas can be forced under the necessary pressure into the liquid in the receptacle and whereby the sucking back of liquid into the piping above the liquid level is prevented.

11. An apparatus for absorbing chlorine in liquids to be chlorinated, comprising a chlorine container, a tank or receptacle containing or adapted to contain the liquids to be chlorinated, and connecting piping extending from the chlorine container to the receptacle, said connecting piping extending downwardly into the receptacle and being arranged to extend a considerable distance above the liquid level in said receptacle, in conjunction with a vacuum break device for destroying a partial vacuum in said connection when the pressure therein falls materially below atmospheric, whereby the chlorine can be forced into the liquid under the necessary pressure and whereby the sucking back upwardly into the piping of the liquid is prevented.

In testimony whereof I affix my signature.

MAX MAURAN.